(12) United States Patent
Shin et al.

(10) Patent No.: US 10,281,812 B2
(45) Date of Patent: May 7, 2019

(54) PROJECTION DEVICE USING MICRO LED PANEL AND METHOD OF FABRICATING THE SAME

(71) Applicant: LUMENS CO., LTD., Yongin-si, Gyeonggi-do (KR)

(72) Inventors: Eun Sung Shin, Yongin-si (KR); Dong Hee Cho, Yongin-si (KR); Yong Pil Kim, Yongin-si (KR); Myung Ji Moon, Yongin-si (KR); Han Beet Chang, Yongin-si (KR); Jae Soon Park, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 15/888,901

(22) Filed: Feb. 5, 2018

(65) Prior Publication Data

US 2018/0307129 A1 Oct. 25, 2018

(30) Foreign Application Priority Data

Apr. 21, 2017 (KR) .................. 10-2017-0051879

(51) Int. Cl.
G03B 21/20 (2006.01)
(52) U.S. Cl.
CPC ....... *G03B 21/204* (2013.01); *G03B 21/2013* (2013.01)
(58) Field of Classification Search
None
See application file for complete search history.

(56) References Cited

U.S. PATENT DOCUMENTS

| 8,642,363 B2* | 2/2014 | Lau | H01L 27/156 257/E21.499 |
| 9,653,642 B1* | 5/2017 | Raring | H01L 33/0075 |
| 2009/0230878 A1 | 9/2009 | Naito et al. | |

FOREIGN PATENT DOCUMENTS

| JP | 2000-66301 A | 3/2000 |
| JP | 2008-205985 A | 9/2008 |
| JP | 2008-262993 A | 10/2008 |
| JP | 2009-509326 A | 3/2009 |
| JP | 2009-224516 A | 10/2009 |
| JP | 2009-238847 A | 10/2009 |
| JP | 2016-71128 A | 5/2016 |
| JP | 2016-122704 A | 7/2016 |
| JP | 2016-155262 A | 9/2016 |
| JP | 2016175360 A | 10/2016 |
| JP | 2017-016785 A | 1/2017 |
| KR | 10-20065-0035324 A | 4/2005 |

(Continued)

*Primary Examiner* — Ashok Patel
(74) *Attorney, Agent, or Firm* — Mei & Mark LLP

(57) ABSTRACT

Disclosed is a projection device using a micro light emitting diode (LED) panel, the projection device including: a first micro LED panel configured to output light of a first wavelength using first micro LED pixels with the first wavelength; a second micro LED panel configured to output light of a second wavelength using second micro LED pixels with the second wavelength; a third micro LED panel configured to output light of a third wavelength using the first or second micro LED pixels; and a dichroic prism configured to synthesize lights output from the first to third micro LED panels, wherein the third micro LED panel includes a color conversion film for changing the light of the first or second wavelength to the light of the third wavelength.

6 Claims, 19 Drawing Sheets

(56) References Cited

FOREIGN PATENT DOCUMENTS

| KR | 10-2016-036584 A | 4/2016 |
| WO | 2007/034367 A1 | 3/2007 |
| WO | 2015-010554 A | 1/2015 |

\* cited by examiner

Prior Art

Prior Art

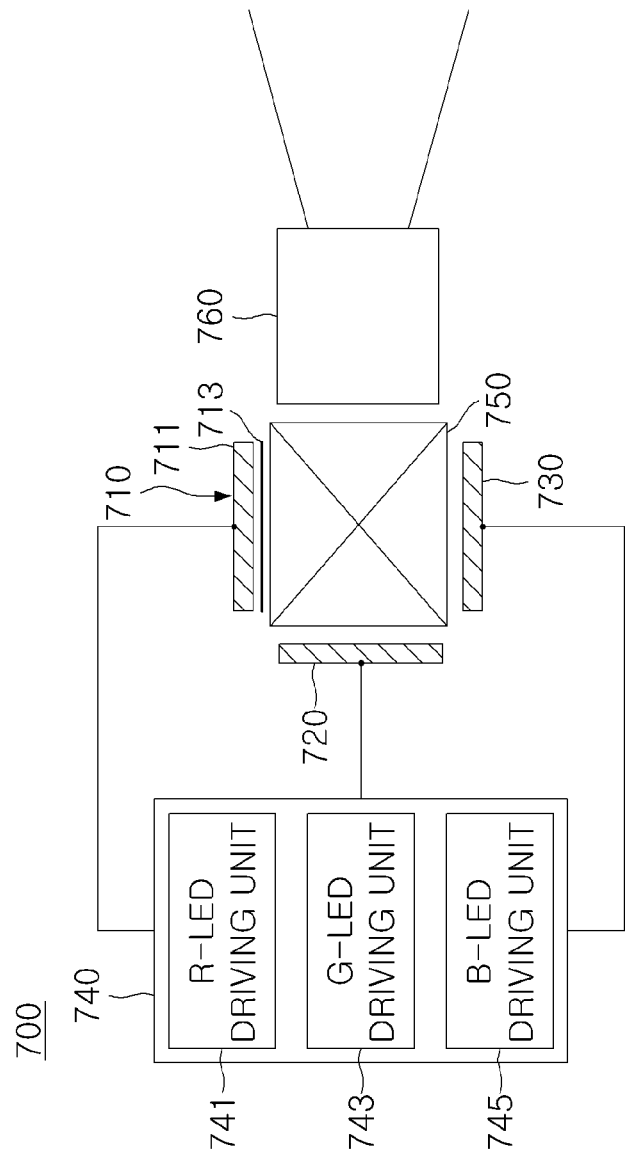

PROJECTION DEVICE USING MICRO LED PANEL AND METHOD OF FABRICATING THE SAME

CROSS-REFERENCE TO RELATED APPLICATIONS

This application claims priority to and the benefit of Korean Patent Application No. 10-2017-0051879 filed in the Korean Intellectual Property Office on Apr. 21, 2017, the entire contents of which are incorporated herein by reference.

BACKGROUND OF THE DISCLOSURE

1. Field of the Disclosure

The present invention relates to a projection device and a method of fabricating the same, and more particularly, to a projection device which is capable of implementing a full color of high resolution by using a micro light emitting diode (LED) panel, and a method of fabricating the same.

2. Background of the Disclosure

A light emitting diode (LED) is a sort of semiconductor device which converts electric energy to light energy. The LED has advantages in low power consumption, semi-permanent life, high response speed, safety, and eco friendliness, compared to an existing light source, such as fluorescent light and incandescent light.

In this respect, a lot of research on replacement of the existing light source with the LED has been conducted, and there increases the case in which the LED is used as a light source of a lighting device, such as various lamps used in indoor and outdoor places, a liquid crystal display device, an electronic display, and a streetlamp.

Recently, an LED industry makes a new attempt to be applied to various industries beyond an existing traditional lighting range, and particularly, research is actively conducted in a low power driven flexible display field, an attachment-type information display device field for monitoring a human body, a vital reaction and deoxyribonucleic acid (DNA) sensing field, a bio convergence field for verifying effectiveness of optogenetics, and a photonics textile field in which conductive fiber is combined with an LED light source.

In general, when an LED chip is fabricated in a size of several to several tens of micros which is small, it is possible to overcome a disadvantage in that the LED chip is broken when an inorganic material is bent according to a characteristic of the inorganic material, and it is possible to broadly apply the LED chip to various application fields up to a wearable device and a medical device for body insertion and a PICO projector, as well as the foregoing flexible display, by giving flexibility by transferring the LED chip to a flexible substrate.

In the meantime, a projection device (or a projector) is one of the projection apparatuses, and is an optical device which enlarges and projects a picture, a drawing, characters, and the like on a slide or a transparent paper on a screen through a lens to enable many people to view at the same time. The projection device needs to have sufficient brightness in order to obtain required image brightness. Accordingly, the projection devices in a general type use a high current consuming lamp, such as a metal halogen lamp, a high-voltage mercury lamp, and a Zenon lamp, in order to achieve the sufficient brightness.

For example, as illustrated in FIG. 1A and FIG. 1B, a projection device in the related art generally has a projection device in a digital light processing (DLP) scheme and a projection device in a liquid crystal on silicon (LCoS) scheme. The projection device in the DLP scheme adopts a scheme using a reflective device in which a light source emitted from a lamp alternately passes through color wheels of various colors, and the passing light source is reflected in a digital micromirror device (DMD) chip to display an image. In contrast to this, the projection device in the LCoS scheme adopts a scheme in which a light source emitted from a lamp is separated through a special mirror, and the separated light sources penetrate three LCD panels (that is, blue/green/red LCD panels), respectively, to be reflected in a screen.

However, the projection devices in the DLP scheme and the LCoS scheme require a separate light source lamp, thereby causing problems in that flexibility in fabricating a device is degraded and optical efficiency deteriorates. Accordingly, it is necessary to develop a new projection device which is capable of implementing a full color of high resolution while having a compact structure.

SUMMARY OF THE DISCLOSURE

An object of the present is to solve the foregoing problems and other problems. Another object of the present invention is to provide a projection device using a micro light emitting diode (LED) panel, and a method of fabricating the same.

Another object of the present invention is to provide a projection device which is capable of implementing a red micro LED panel by using a blue micro LED panel and a color conversion film, and a method of fabricating the same.

Another object of the present invention is to provide a projection device which is capable of implementing a red micro LED panel by using a green micro LED panel and a color conversion film, and a method of fabricating the same.

Another object of the present invention is to provide a projection device which is capable of implementing a red micro LED panel by avoiding a sapphire bonding process, and a method of fabricating the same.

An exemplary embodiment of the present invention provides a projection device, including: a first micro LED panel configured to output light of a first wavelength using first micro LED pixels with the first wavelength; a second micro LED panel configured to output light of a second wavelength using second micro LED pixels with the second wavelength; a third micro LED panel configured to output light of a third wavelength using the first or second micro LED pixels; and a dichroic prism configured to synthesize lights output from the first to third micro LED panels, wherein the third micro LED panel includes a color conversion film for changing the light of the first or second wavelength to the light of the third wavelength.

Another exemplary embodiment of the present invention provides a method for fabricating a third micro light emitting diode (LED) display device in a projection device, which includes a first micro LED display device outputting light of a first wavelength, a second micro LED display device outputting light of a second wavelength, and the third micro LED display device outputting light of a third wavelength, the method including: forming a GaAs substrate; stacking emission structures on the GaAs substrate; making a micro LED panel including a plurality of micro LED pixels formed by performing an etching process on the emission structures according to a unit pixel area; flip-chip bonding the micro LED panel onto a silicon substrate; and separating the GaAs substrate attached onto the micro LED panel.

Effects of the projection device and the method of fabricating the same according to the exemplary embodiments of the present invention will be described below.

According to at least one of the exemplary embodiments of the present invention, it is possible to implement a projection device using a red micro LED panel, a green micro LED panel, and a blue micro LED panel, thereby achieving a compact structure and providing a full color of high resolution (HD level).

According to at least one of the exemplary embodiments of the present invention, it is possible to implement a red micro LED panel by using a blue micro LED panel or a green micro LED panel and a color conversion film, thereby fabricating the red micro LED panel, the green micro LED panel, and the blue micro LED panel provided in the projector during the same process.

According to at least one of the exemplary embodiments of the present invention, it is possible to implement a red micro LED panel by avoiding a sapphire bonding process, thereby simplifying an LED panel manufacturing process, improving yield of a product, and minimizing deterioration of performance generated during a fabricating process.

However, the effects achieved by the projection device and the method of fabricating the same according to the exemplary embodiments of the present invention are not limited to the foregoing matters, and non-mentioned other effects may be clearly appreciated to those skilled in the art on the basis of the descriptions below.

BRIEF DESCRIPTION OF THE DRAWINGS

FIG. 7 is a configuration diagram of a projection device according to another exemplary embodiment of the present invention.

DETAILED DESCRIPTION OF THE PREFERRED EMBODIMENTS

Figure 1A:
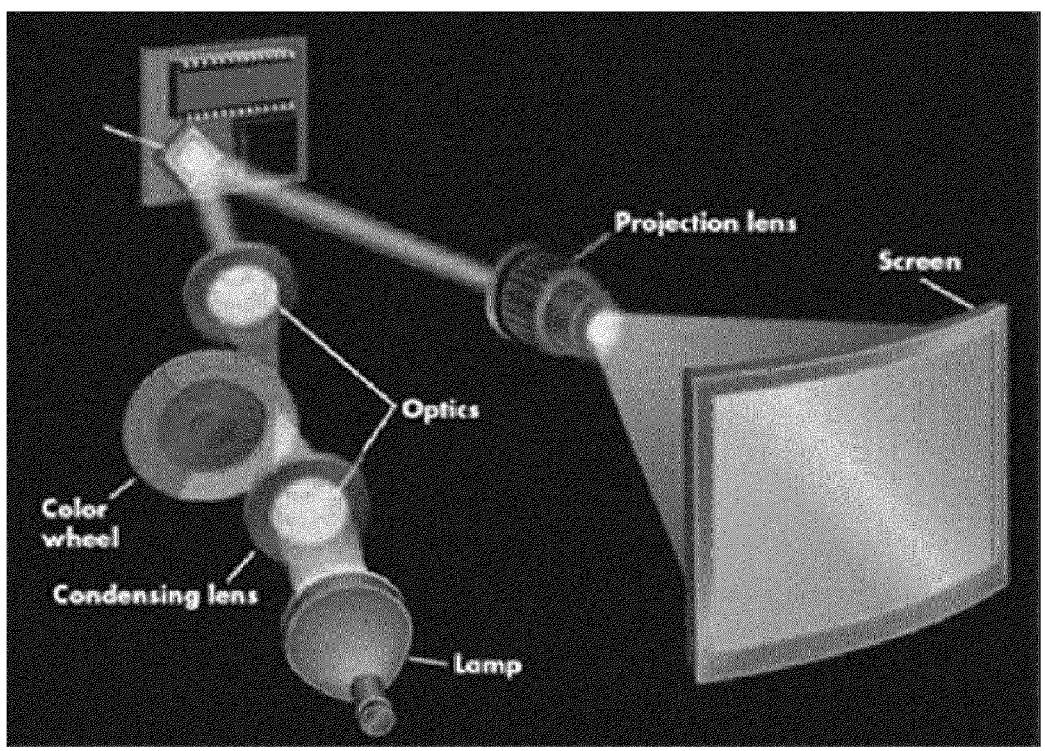
FIGS. 1A and 1B are a diagram illustrating an operation scheme of a projection device in the related art.
Figure 1B:
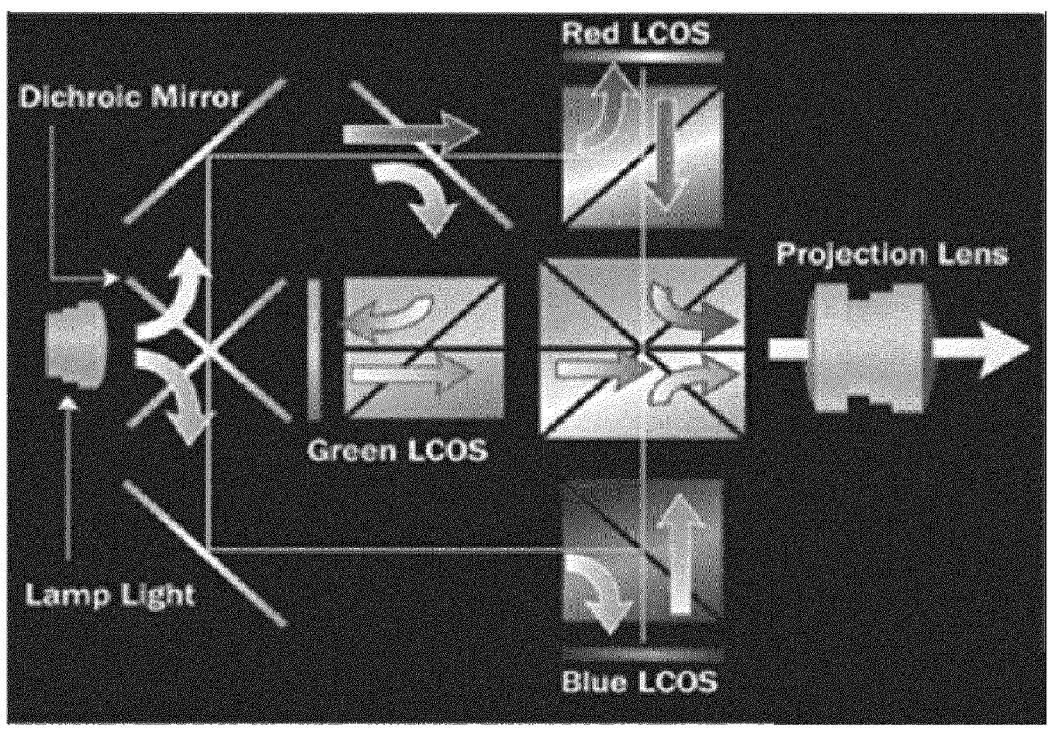

Hereinafter, exemplary embodiments disclosed in the present specification will be described in detail with reference to the accompanying drawings, and the same or similar constituent elements are denoted by the same reference numerals regardless of a sign of the drawing, and repeated description thereof will be omitted. Suffixes "module" and "unit" for constituent elements used in the description below are given or used together in consideration of only easiness of drafting the specification, and the suffixes "module" and "unit" themselves do not mean a discrimination therebetween or serve to discriminate from each other. That is, a term "~ unit" used in the present invention means a hardware constituent element, such as software, a field programmable gate array (FPGA) or an application specific integrated circuit (ASIC), and the "~ unit" performs specific functions. However, the "~ unit" does not have meaning limited to software or hardware. The "~ unit" may be configured to be present in an addressable storage medium or may also be configured to reproduce one or more processors. Accordingly, as an example, the "~ unit" includes constituent elements, such as software constituent elements, object-oriented software constituent elements, class constituent elements, and task constituent elements, and processes, functions, attributes, procedures, sub-routines, segments of a program code, drivers, firmware, a micro code, a circuit, data, a database, data structures, tables, arrays, and variables. Functions provided within the constituent elements and the "~units" may be combined with the smaller number of constituent elements and "~units", or may be further separated to additional constituent elements and "~units".

In the description of the exemplary embodiments of the present invention, a case where each layer (film), a region, a pattern, or structures are formed "on" or "under" a substrate, each layer (film), a region, a pad, or patterns includes all of the cases in which each layer (film), the region, the pattern, or the structures are directly formed "on" or "under" the substrate, each layer (film), the region, the pad, or the patterns, or intervening constituent elements are present. Further, a reference of "on" or "under" each layer is described with reference to the drawings. In the drawings, for convenience and clearness of description, a thickness or a size of each layer is exaggerated, omitted, or schematically illustrated. Further, a size of each constituent element does not totally reflect an actual size.

In describing the exemplary embodiments disclosed in the present specification, a detailed explanation of known related technology may be omitted so as to avoid unnecessarily obscuring the subject matter of the exemplary embodiments disclosed in the present specification. Further, the accompanying drawings are provided for helping easy understanding of the exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

The present invention suggests a projection device which is capable of implementing a full color of high resolution by using a red micro LED panel, a green micro LED panel, and a blue micro LED panel, and a method of fabricating the same.

Hereinafter, various exemplary embodiments of the present invention will be described in detail with reference to the drawings.

Figure 2:
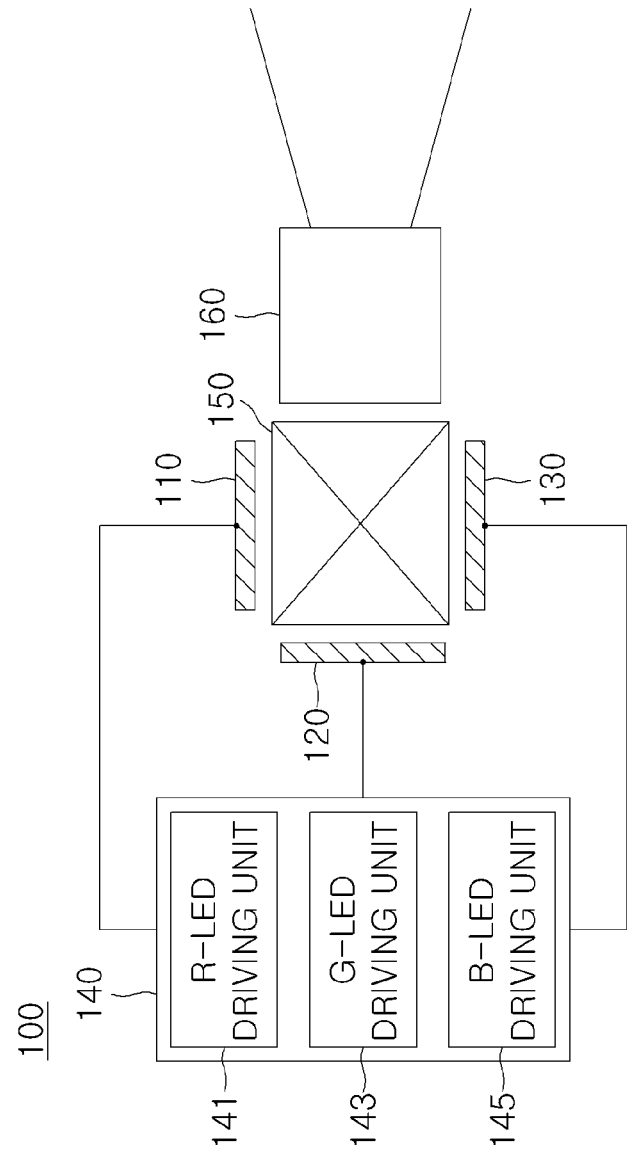
FIG. 2 is a configuration diagram of a projection device according to an exemplary embodiment of the present invention.

FIG. 2 is a configuration diagram of a projection device according to an exemplary embodiment of the present invention.

Referring to FIG. 2, a projection device 100 according to an exemplary embodiment of the present invention may include a red micro light emitting diode (LED) panel 110, a green micro LED panel 120, a blue micro LED panel 130, an LED driving unit 140, a dichroic prism 150, a projection lens 160, and the like.

The red micro LED panel 110 is an LED panel including an array structure in which a plurality of LEDs (that is, the plurality of micro LED pixels) stacked on a wafer is arranged in a matrix form, and may serve to output red light corresponding to an image signal of an image display device. In this case, the plurality of micro LED pixels configuring the corresponding panel 110 may be formed of red LED devices.

The green micro LED panel 120 is an LED panel including an array structure in which a plurality of LEDs (that is, the plurality of micro LED pixels) stacked on a wafer is arranged in a matrix form, and may serve to output green light corresponding to an image signal of an image display device. In this case, the plurality of micro LED pixels configuring the corresponding panel 120 may be formed of green LED devices.

The blue micro LED panel 130 is an LED panel including an array structure in which a plurality of LEDs (that is, the plurality of micro LED pixels) stacked on a wafer is arranged in a matrix form, and may serve to output blue light corresponding to an image signal of an image display device. In this case, the plurality of micro LED pixels configuring the corresponding panel 130 may be formed of blue LED devices.

Figure 3A:
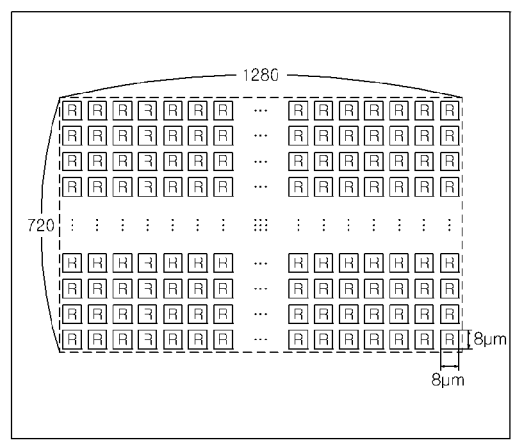
FIGS. 3A to 3C are a diagram illustrating a red micro LED panel, a green micro LED panel, and a blue micro LED panel provided in the projection device.
Figure 3B:
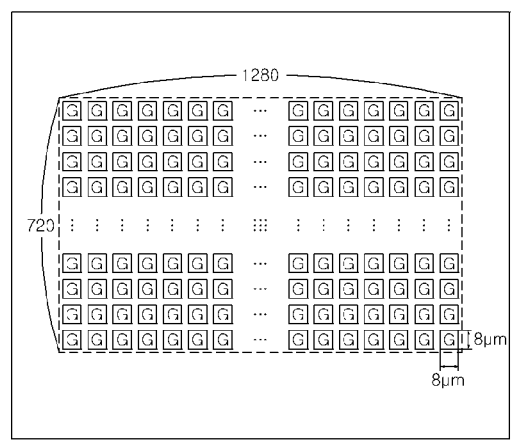
Figure 3C:
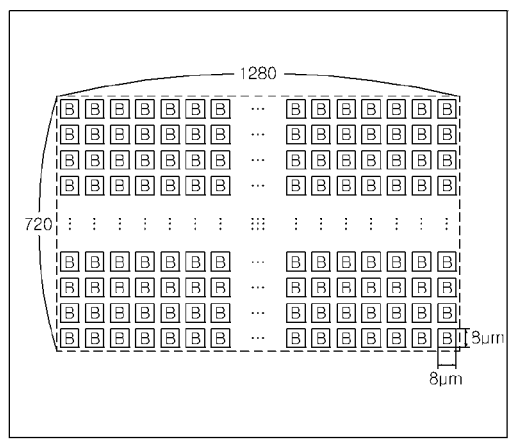

For example, as illustrated in FIGS. 3A to 3C, the red micro LED panel 110, the green micro LED panel 120, and the blue micro LED panel 130 configuring the corresponding projection device 100 may include micro LED pixels arranged in a plurality of rows 720 and a plurality of columns 1280. Further, each of the plurality of micro LED pixels configuring the micro LED panels 110, 120, and 130 may be formed in a size of 8 μm×8 μm. However, the projection device 100 may be fabricated by changing the number of pixels and a pixel size of the micro LED panels 110, 120, and 130 according to a usage, a kind, and the like of the projection device 100, which will be apparent to those skilled in the art.

The red micro LED panel 110, the green micro LED panel 120, and the blue micro LED panel 130 configuring the corresponding projection device 100 may be disposed to be vertical to the adjacent panels. For example, the green micro LED panel 120 may be disposed in a left region of the dichroic prism 150, the red micro LED panel 110 may be disposed in an upper region of the dichroic prism 150, and the blue micro LED panel 130 may be disposed in a lower region of the dichroic prism 150.

The LED driving unit 140 may perform an operation of driving the red micro LED panel 110, the green micro LED panel 120, and the blue micro LED panel 130. That is, the LED driving unit 140 may include an R-LED driving unit 141 for driving the red micro LED panel 110, a G-LED driving unit 143 for driving the green micro LED panel 120, and a B-LED driving unit 145 for driving the blue micro LED panel 130.

In the meantime, in the present exemplary embodiment, for convenience of description, the example in which the R-LED driving unit 141, the G-LED driving unit 143, and the B-LED driving unit 145 are independently configured is illustrated, but the present invention is not limited thereto, and the R-LED driving unit 141, the G-LED driving unit 143, and the B-LED driving unit 145 may be integrally formed with the red micro LED panel 110, the green micro LED panel 120, and the blue micro LED panel 130, which will be apparent to those skilled in the art. That is, the R-LED driving unit 141, the G-LED driving unit 143, and the B-LED driving unit 145 may be formed as a CMOS backplane disposed in a rear direction of the red micro LED panel 110, the green micro LED panel 120, and the blue micro LED panel 130.

The CMOS backplane may include an active matrix circuit unit including a plurality of CMOS cells for individually driving the plurality of micro LED pixels, and a common cell disposed in an outer region of the active matrix circuit unit.

Each of the plurality of CMOS cells provided in the active matrix circuit unit is electrically connected to the corresponding micro LED pixel through a bump. Each of the plurality of CMOS cells is an integrated circuit (IC) for individually driving the corresponding micro LED pixel. Accordingly, each of the plurality of CMOS cells may be a pixel driving circuit including two transistors and one capacitor, and when the micro LED panel is flip-chip bonded to the CMOS backplane by using the bumps, each of the plurality of CMOS cells may be configured in a form in which the individual micro LED pixel is disposed between a drain terminal and a common ground terminal of the transistor of the pixel driving circuit according to the equivalent circuit.

Figure 4:
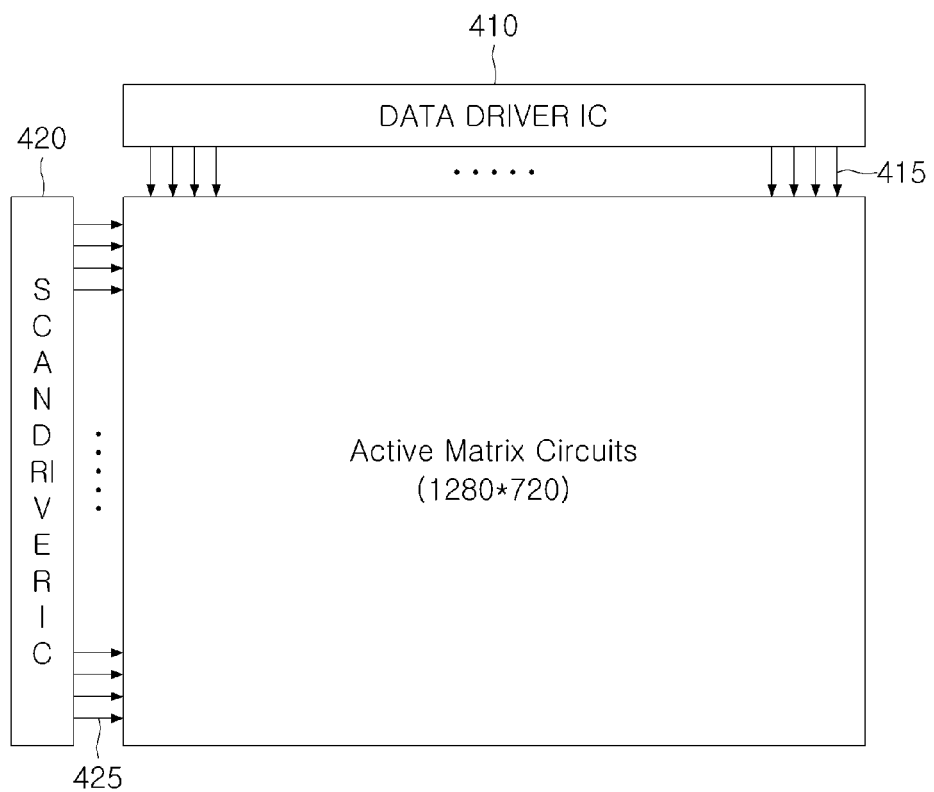
FIG. 4 is a diagram for describing an operation of driving a micro LED panel through a data driver IC and a scan driver IC.

The common cell disposed in the outer region of the active matrix circuit unit may include a data driver IC and a scan driver IC. For example, as illustrated in FIG. 4, the plurality of micro LED pixels (not illustrated) configuring the micro LED panels 110 to 130 may be positioned at crossing points of a plurality of scanning lines 425 and a plurality of data lines 415. The plurality of scanning lines 425 input to the plurality of micro LED pixels are controlled by a scan driver IC 420, and the plurality of data lines 415 is are controlled by a data driver IC 410.

Control operations of the micro LED panels 110 to 130 through the CMOS backplane will be simply described. The scan driver IC 420 turns on the pixels by inputting a high (H) signal to any one or more of the plurality of scanning lines 425 while scanning all of the plurality of scanning lines 425 when providing image data. In the meantime, when the data driver IC 410 provides image data to the plurality of data lines 415, the pixels which are in a turn-on state in the scanning lines allow the image data to pass through and the corresponding image data is displayed through the micro LED panel. By this manner, a display for one frame is completed while all of the scanning lines are sequentially scanned.

The dichroic prism 150 may serve to synthesize red light output from the red micro LED panel 110, green light output from the green micro LED panel 120, and blue light output from the blue micro LED panel 130.

The projection lens 160 may serve to enlarge the synthesized light output from the dichroic prism 150 and emit the enlarged light to a front screen.

As described above, the projection device 100 using the red micro LED panel, the green micro LED panel, and the blue micro LED panel does not require a separate light source lamp, thereby improving flexibility in fabricating a device, and implementing a full color of high resolution by an increase in optical efficiency and color reproducibility.

Figure 5A:
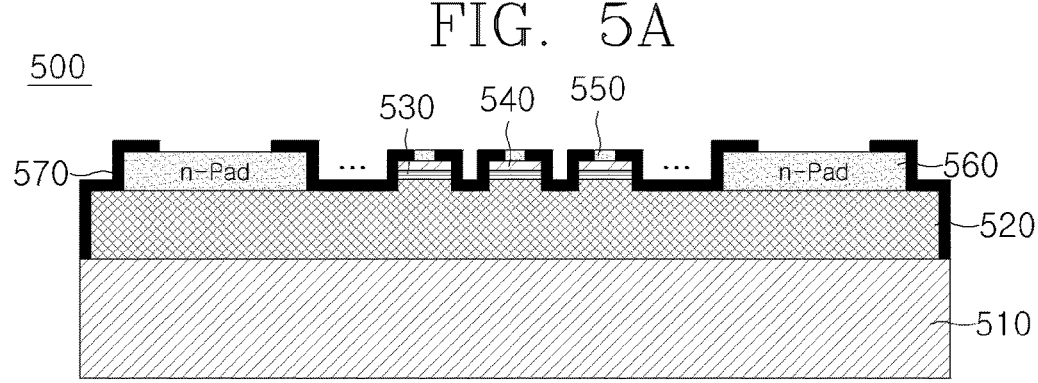
FIG. 5A is a cross-sectional view of the micro LED panel according to the exemplary embodiment of the present invention.
Figure 5B:
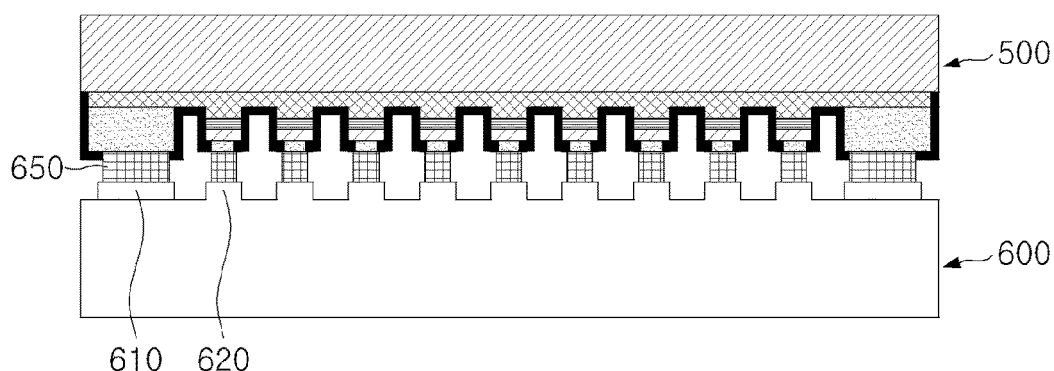
FIG. 5B is a cross-sectional view of a micro LED display device.

FIG. 5A is a cross-sectional view of the micro LED panel according to the exemplary embodiment of the present invention, and FIG. 5B is a cross-sectional view of a micro LED display device. Herein, the micro LED display device may be formed by flip-chip bonding the micro LED panel and the CMOS backplane through the bumps.

Referring to FIG. 5A, a micro LED panel 500 according to the present invention is an LED panel including an array structure in which a plurality of LEDs (that is, a plurality of micro LED pixels) stacked on a wafer is arranged in a matrix form, and may serve to output light corresponding to an image signal of an image display device.

The micro LED panel 500 may include a substrate 510, a first conductive semiconductor layer 520 on the substrate 510, an active layer 530 on the first conductive semiconductor layer 520, a second conductive semiconductor layer 540 on the active layer 530, first and second conductive metal layers 560 and 550, and a passivation layer 570.

The substrate 510 may be formed of at least one of the materials having transparency, for example, sapphire ($Al_2O_3$), a single crystal substrate, SiC, GaAs, GaN, ZnO, AlN, Si, GaP, InP, and Ge, but is not limited thereto.

The first conductive semiconductor layer 520 may include a compound semiconductor of III-V group elements in which an n-type dopant is doped. The first conductive semiconductor layer 520 may be selected from semiconductor materials, for example, InAlGaN, GaN, AlGaN, AlInN, InGaN, AlN, and InN, having an empirical formula of $In_xAl_yGa_{1-x-y}N$ ($0 \leq x \leq 1$, $0 \leq y \leq 1$, $0 \leq x+y \leq 1$), and an n-type dopant, such as Si, Ge, and Sn, may be doped.

The active layer 530 is a layer in which electrons (or holes) injected through the first conductive semiconductor layer 520 and holes (or electrons) injected through the second conductive semiconductor layer 540 meet to emit light by a difference in a band gap of an energy band according to a forming material of the active layer 430. The active layer 530 may be formed in any one of a single quantum well structure, a multi-quantum well (MQW) structure, a quantum dot structure, or a quantum wire structure, but is not limited thereto. The active layer 530 may be formed of a semiconductor material having an empirical formula of $In_xAl_yGa_{1-x-y}N$ ($0 \leq x \leq 1$, $0 \leq y \leq 1$, $0 \leq x+y \leq 1$). When the active layer 530 is formed in the MQW structure, the active layer 530 may be formed by alternately stacking a plurality of well layers and a plurality of barrier layers.

The second conductive semiconductor layer 540 may include a compound semiconductor of III-V group elements in which a p-type dopant is doped. The second conductive semiconductor layer 540 may be selected from semiconductor materials, for example, InAlGaN, GaN, AlGaN, InGaN, AlInN, AlN, InN, having an empirical formula of $In_xAl_yGa_{1-x-y}N$ ($0 \leq x \leq 1$, $0 \leq y \leq 1$, $0 \leq x+y \leq 1$), and a p-type dopant, such as Mg, Zn, Ca, Sr, and Ba, may be doped.

The second conductive metal layer 550 (that is, a p electrode) may be formed on the second conductive semiconductor layer 540, and the first conductive metal layer 560 (that is, an n electrode) may be formed on the first conductive semiconductor layer 520. The first and second conductive metal layers 560 and 550 provide power to the plurality of micro LED pixels formed in the micro LED panel 500.

The second conductive metal layer 550 may be disposed on the second conductive semiconductor layer 540 corresponding to each of the micro LED pixels, and may be electrically connected with each CMOS cell 620 provided in the CMOS backplane 600 through bumps 650. In the meantime, as another exemplary embodiment, when a reflective layer (not illustrated), such as a distributed Bragg reflector (DBR) is present on the second conductive semiconductor layer 540, the second conductive metal layer 550 may be disposed on the reflective layer.

The first conductive metal layer 560 may be disposed on mesa-etched regions of the first conductive semiconductor layer 520, and may be formed while being spaced apart from the plurality of micro LED pixels by a predetermined distance. The first conductive metal layer 560 may be formed on the first conductive semiconductor layer 520 so as to have a predetermined width along an outer region of the micro LED panel 500. A height of the first conductive metal layer 560 may be formed to be substantially the same as a height of the plurality of micro LED pixels. The first conductive metal layer 560 is electrically connected with the common cell 610 of the CMOS backplane 600 by the bumps, and serves as a common electrode of the micro LED pixels. For example, the first conductive metal layer 560 may be a common ground.

The passivation layer 570 may be formed on at least one lateral surface of the first conductive semiconductor layer 520, the active layer 530, the second conductive semiconductor layer 540, the second conductive metal layer 550, and the first conductive metal layer 560. The passivation layer 570 may be formed to electrically protect the emission structures 520, 530, and 540, and may be formed of, for example, $SiO_2$, $SiO_x$, $SiO_xN_y$, $Si_3N_4$, $Al_2O_3$, but is not limited thereto.

The LEDs (that is, the plurality of micro LED pixels) formed as described above may emit light of different wavelengths according to a composition ratio of a compound semiconductor. When the LEDs included in the micro LED panel 500 are the red LED devices, the micro LED panel 500 may be the red micro LED panel 500. When the LEDs included in the micro LED panel 500 are the green LED devices, the micro LED panel 500 may be the green micro LED panel 500. When the LEDs included in the micro LED panel 500 are the blue LED devices, the micro LED panel 500 may be the blue micro LED panel 500.

Referring to FIG. 5B, the micro LED display device includes the micro LED panel 500, the CMOS backplane 600, and the bumps 650. In this case, the CMOS backplane 600 may include an active matrix circuit unit including a plurality of CMOS cells 620, and a common cell 610 disposed in an outer region of the active matrix circuit unit.

The micro LED panel 500 includes the plurality of micro LED pixels, and the CMOS backplane 600 includes the plurality of CMOS cells 620 corresponding to the micro LED pixels, respectively, for individually driving the plurality of micro LED pixels, respectively. In this case, a pixel region of the micro LED panel 500 may correspond to an AM region of the CMOS backplane 600.

The bumps 650 electrically connect the micro LED pixels and the CMOS cells 610 corresponding to the micro LED pixels, respectively, in the state where the micro LED pixels and the CMOS cells 620 are disposed to face.

A fabricating process of the micro LED display device will be simply described. First, the plurality of bumps 650 is disposed on the CMOS cells 620 and the common cell 610 of the CMOS backplane 600. Then, the CMOS cells 620 are in close contact with the micro LED pixels by making the CMOS backplane 600 in the state where the plurality of bumps 650 is disposed face the micro LED panel 500 and corresponding one-to-one the CMOS cells 620 and the micro LED pixels, and then heating is performed on the CMOS cells 620 and the micro LED pixels. Then, the plurality of bumps 650 is melted, and as a result, the CMOS cells 620 and the corresponding micro LED pixels are electrically connected, and the common cell 610 of and the common electrode 560 of the micro LED panel 500 corresponding to the common cell 610 are electrically connected.

FIGS. 6A to 6G are diagrams for describing a method of fabricating the micro LED display device according to an exemplary embodiment of the present invention.

Figure 6A:
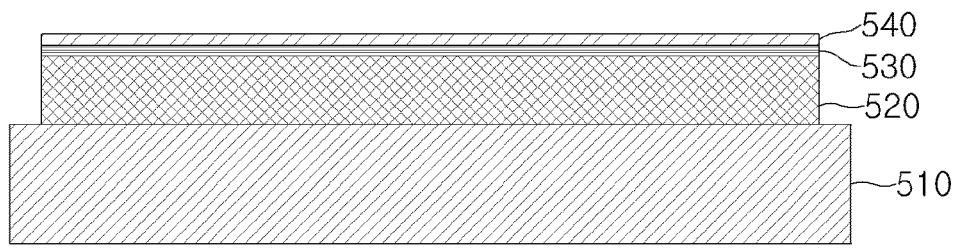
FIGS. 6A to 6G are diagrams for describing a method of fabricating the micro LED display device according to an exemplary embodiment of the present invention.

Referring to FIG. 6A, the emission structures 520, 530, and 540 may be formed by sequentially growing the first conductive semiconductor layer 520, the active layer 530, and the second conductive semiconductor layer 540 on the substrate 510.

The substrate 510 may be formed of at least one of the materials having transparency, for example, sapphire ($Al_2O_3$), a single crystal substrate, SiC, GaAs, GaN, ZnO, AlN, Si, GaP, InP, and Ge, but is not limited thereto.

The first conductive semiconductor layer 520 may be selected from semiconductor materials, for example, InAlGaN, GaN, AlGaN, AlInN, InGaN, AlN, and InN, having an empirical formula of $In_xAl_yGa_{1-x-y}N$ ($0 \leq x \leq 1$, $0 \leq y \leq 1$, $0 \leq x+y \leq 1$), and an n-type dopant, such as Si, Ge, and Sn, may be doped. The first conductive semiconductor layer 520 may be formed by injecting trimethyl gallium (TMGa) gas, ammonia ($NH_3$) gas, and xylene ($SiH_4$) gas to a chamber together with hydrogen gas. An undoped semiconductor layer (not illustrated) and/or a buffer layer (not illustrated) may be further included between the substrate 510 and the first conductive semiconductor layer 520, but the present invention is not limited thereto.

The active layer 530 may be formed of a semiconductor material having an empirical formula of $In_xAl_yGa_{1-x-y}N$ ($0 \leq x \leq 1$, $0 \leq y \leq 1$, $0 \leq x+y \leq 1$). The active layer 530 may be formed by injecting trimethyl gallium (TMGa) gas, trimethyl indium (TMIn) gas, and ammonia ($NH_3$) gas to a chamber together with hydrogen gas.

The second conductive semiconductor layer 540 may be selected from semiconductor materials, for example, InAlGaN, GaN, AlGaN, InGaN, AlInN, AlN, InN, having an empirical formula of $In_xAl_yGa_{1-x-y}N$ ($0 \leq x \leq 1$, $0 \leq y \leq 1$, $0 \leq x-Py \leq 1$), and a p-type dopant, such as Mg, Zn, Ca, Sr, and Ba, may be doped. The second conductive semiconductor layer 540 may be formed by injecting trimethyl gallium (TMGa) gas, ammonia ($NH_3$) gas, and biacetyl cyclopentadienyl magnesium ($EtCp_2Mg$){$Mg(C_2H_5C_5H_4)_2$} gas to a chamber together with hydrogen gas.

Figure 6B:
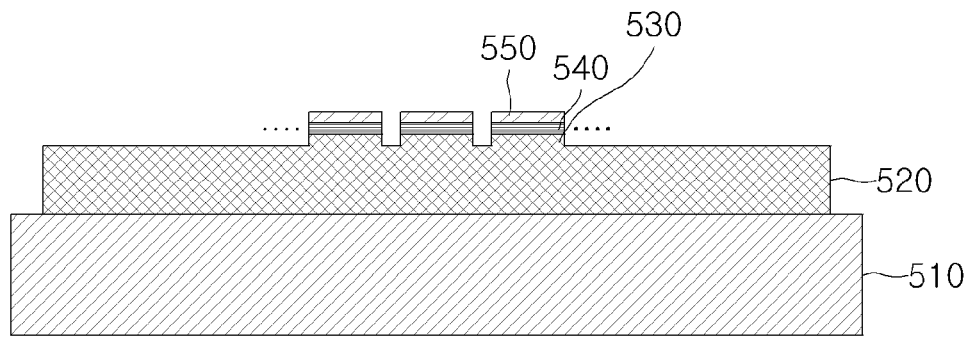

Referring to FIG. 6B, a plurality of LEDs may be formed by performing an isolation etching process on the emission structures 520, 530, and 540 according to a unit pixel region. For example, the isolation etching may be performed by a dry etching method, such as inductively coupled plasma (ICP). One upper surface of the first conductive semiconductor layer 520 is exposed through the isolation etching process. In this case, in order to form the common electrode (that is, the n electrode) 560, the emission structures 520, 530, and 540 may be etched so as that a border region of the first conductive semiconductor layer 520 has a predetermined width.

Figure 6C:
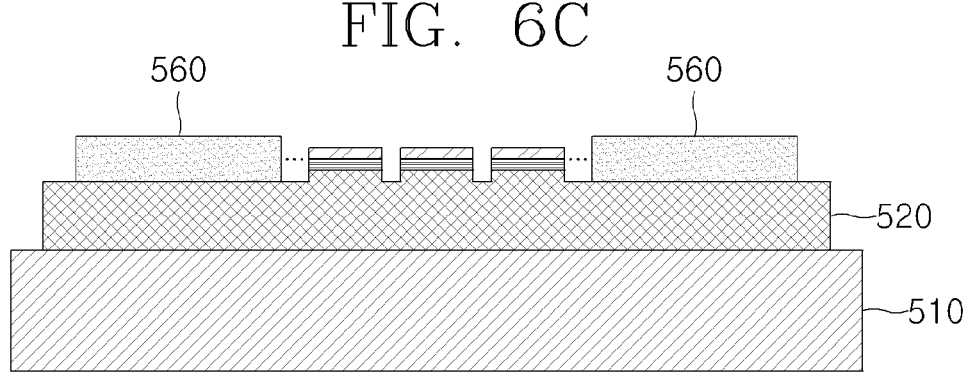
Figure 6D:
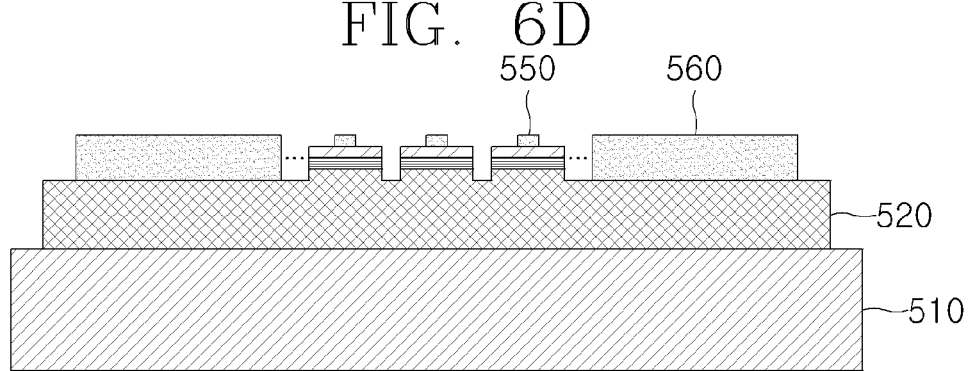

Referring to FIGS. 6C and 6D, the second conductive metal layer 550 may be formed on one upper surface of the second conductive semiconductor layer 540, and the first conductive metal layer 560 may be formed on one upper surface of the mesa-etched first conductive semiconductor layer 540. In this case, the first and second conductive metal layers 560 and 550 may be formed by a deposition process or a plating process, but the present invention is not limited thereto.

Figure 6E:
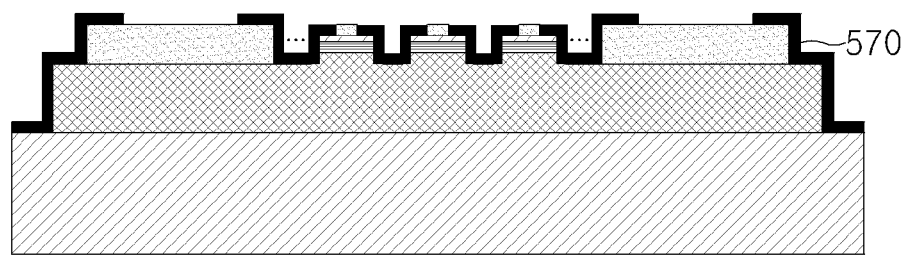

Referring to FIG. 6E, the passivation layer 570 may be formed on the substrate 510, the emission structures 520, 530, and 540, the second conductive metal layer 550, and the first conductive metal layer 560, and the passivation layer 570 may be selectively removed so that one upper surface of each of the first and second conductive metal layers 560 and 550 is exposed to the outside.

Figure 6F:
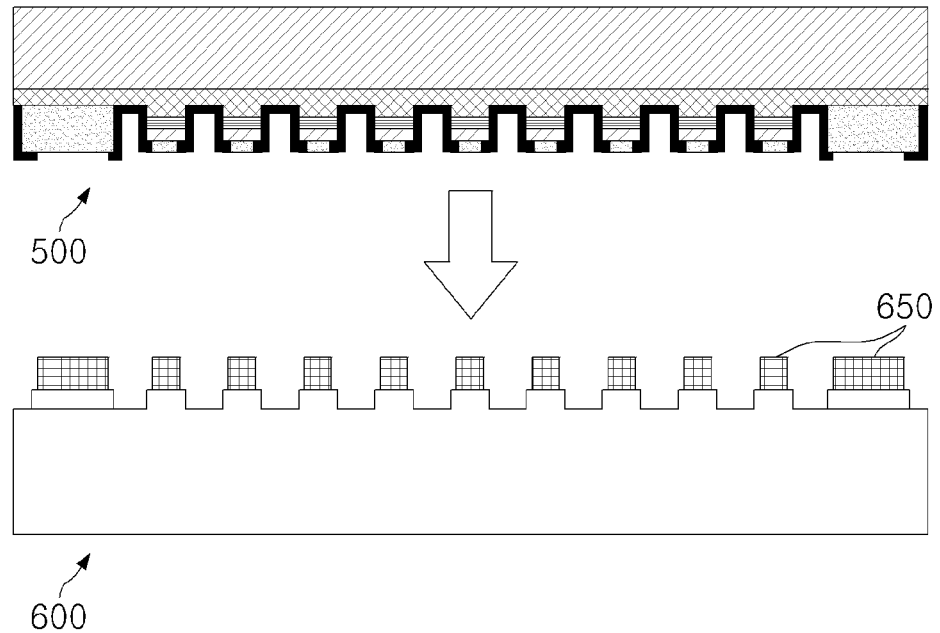
Figure 6G:
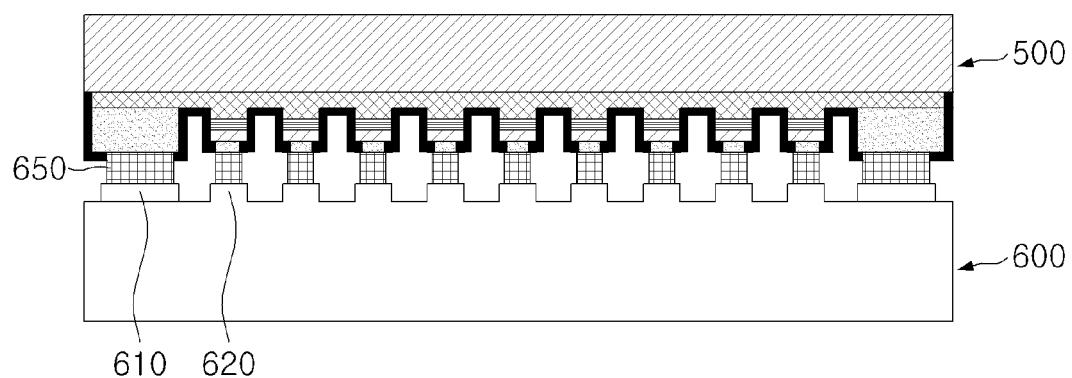

Referring to FIGS. 6F and 6G, the plurality of bumps 650 is disposed on the CMOS cells 620 and the common cell 610 of the CMOS backplane 600. The first and second conductive metal layers 560 and 550 are made to head downwardly by inversing up and down the micro LED panel 500. Then, the CMOS cells 620 are in close contact with the micro LED pixels by making the CMOS backplane 600 in the state where the plurality of bumps 650 is disposed face the micro LED panel 500 and corresponding one-to-one the CMOS cells 620 and the micro LED pixels, and then heating is performed on the CMOS cells 620 and the micro LED pixels. Then, the plurality of bumps 650 is melted, and as a result, the CMOS cells 620 and the corresponding micro LED pixels are electrically connected, and the common cell 610 of the CMOS backplane 600 and the common electrode 560 of the micro LED panel 500 corresponding to the common cell 610 are electrically connected. As described above, it is possible to form the micro LED display device by flip-chip bonding the CMOS backplane 600 and the micro LED panel 500 through the plurality of bumps 650.

FIG. 7 is a configuration diagram of a projection device according to another exemplary embodiment of the present invention.

Referring to FIG. 7, a projection device 700 according to another exemplary embodiment of the present invention may include a red micro LED panel 710, a green micro LED panel 720, a blue micro LED panel 730, an LED driving unit 740, a dichroic prism 750, a projection lens 760, and the like. Herein, the remaining constituent elements other than the red micro LED panel 710 are the same as the constituent elements illustrated in FIG. 2. Accordingly, detailed descriptions of the green micro LED panel 720, the blue micro LED panel 730, the LED driving unit 740, the dichroic prism 750, the projection lens 760 illustrated in FIG. 7 will be omitted.

Unlike the projection device 100 of FIG. 2, the red micro LED panel 710 configuring the corresponding projection device 700 may be formed of a blue micro LED panel 711 and a color conversion film 713.

Generally, a blue LED device and a green LED device are grown on a sapphire substrate, and a red LED device is grown on a GaAs substrate, so that the green micro LED panel and the blue micro LED panel may be fabricated in the same process, but the red micro LED panel requires an additional process for separating the GaAs substrate. Accordingly, when the red micro LED panel 710 is implemented with the blue micro LED panel 711 and the color conversion film 713, it is possible to fabricate all of the micro LED panels 71, 720, and 730 of the projection device 700 by using the same process.

Figure 8:
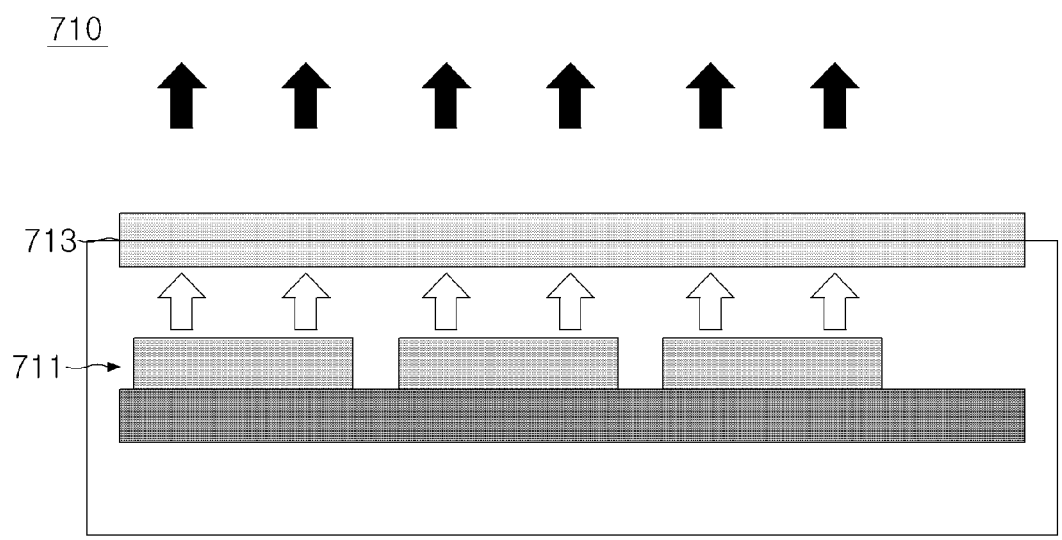
FIG. 8 is a diagram for describing a red micro LED panel according to another exemplary embodiment of the present invention.

FIG. 8 is a diagram for describing the red micro LED panel according to another exemplary embodiment of the present invention.

Referring to FIG. 8, the red micro LED panel 710 according to the present invention may include the blue micro LED panel 711 and the color conversion film 713 on the blue micro LED panel 711.

The blue micro LED panel 711 configuring the red micro LED panel 710 is a panel having an array structure in which a plurality of micro LED pixels is arranged in a matrix form, and may serve to output blue light corresponding to an image signal of an image display device. In this case, the plurality of micro LED pixels configuring the corresponding panel 711 may be formed of blue LED devices.

The color conversion film 713 may serve to change blue light emitted from the blue micro LED panel 711 to red light. Generally, the color conversion film 713 includes an adhesive or a bonding component, so that the color conversion film 713 may be attached onto one surface of the blue micro LED panel 711 which emits blue light. In the meantime, as another exemplary embodiment, when the color conversion film 713 does not include an adhesive or a bonding component, a separate adhesive layer or an adhesive sheet may be formed between the blue micro LED panel 711 and the color conversion film 713.

For example, a fluorescent film and a quantum dot film may be used as the color conversion film 713, but the color conversion film 713 is not limited thereto.

In the meantime, in the present exemplary embodiment, the case where the red micro LED panel is implemented by using the blue micro LED panel and the color conversion film is exemplified, but the present invention is not limited thereto, and it will be apparent to those skilled in the art that the red micro LED panel is implemented by using the green micro LED panel and the color conversion film.

In the present exemplary embodiment, the case where the red micro LED panel 710 is applied to the PICO projector 700 is exemplified, but is not limited thereto, and the red micro LED panel 710 is applicable to various display devices, such as a head-up display (HUD) for a vehicle or a head mounted display (HMD) which will be apparent to those skilled in the art.

Figure 9:
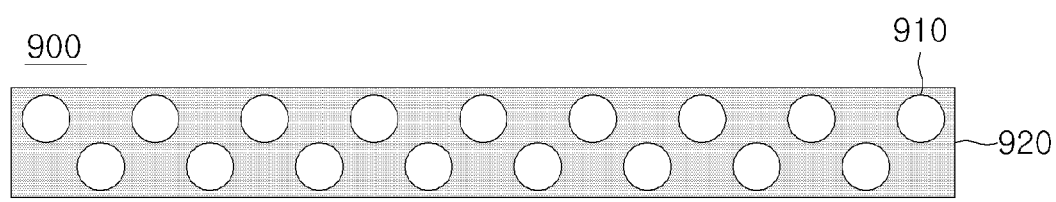
FIGS. 9 and 10 are diagrams for describing a quantum dot film according to an exemplary embodiment of the present invention.
Figure 10:
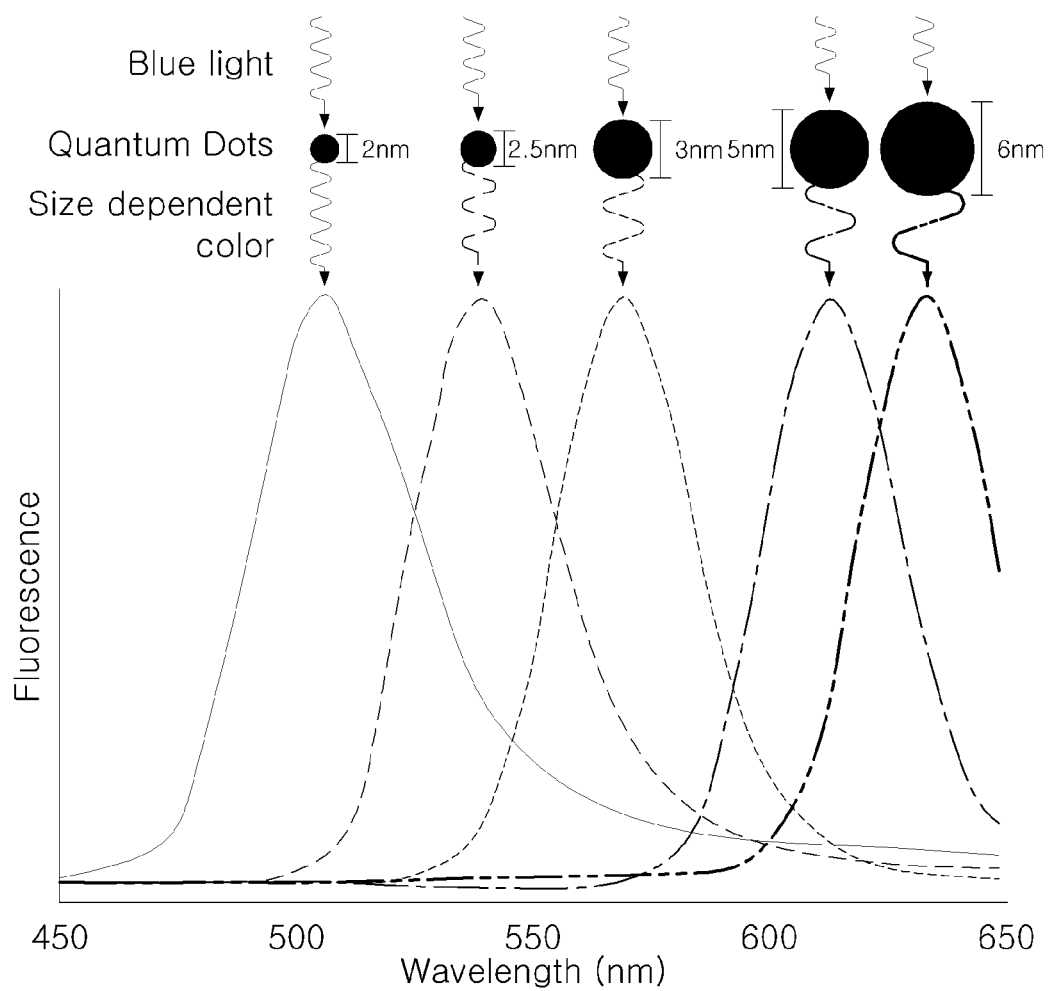

FIGS. 9 and 10 are diagrams for describing a quantum dot film according to an exemplary embodiment of the present invention.

Referring to FIG. 9, a quantum dot film 900 according to the present invention may include a polymer layer 920 in which a plurality of quantum dots 910 is dispersed.

The polymer layer 920 may be formed of plastic resin. The plastic resin may include various materials forming a film based on polymer or silicon, and the kind of material is not limited. In the exemplary embodiment of the present invention, when the plastic resin has a characteristic of transmitting light in a state where the plastic resin is cured, the characteristic is sufficient as a required characteristic of the plastic resin, and transmissivity of light is not limited.

The quantum dots 910 which are capable of changing a wavelength of light and implementing color reproducibility and color purity are dispersed in the polymer layer 920. The quantum dot 910 is a semiconductor nano particle of which a diameter has a size of several nanometers (nm), and has a quantum mechanics characteristic, such as a quantum confinement effect. Herein, the quantum confinement effect means a phenomenon in which as a size of a semiconductor nano particle is decreased, a band gap energy is increased (inversely, a wavelength is decreased).

A representative characteristic of the quantum dot 910 is to emit light (photo luminescence (PL)) when the quantum dot is in contact with light or emit light (electron luminescence (EL)) when electricity is applied to the quantum dot. The quantum dot 910 fabricated by a chemical synthesis process may implement a desired color only by adjusting a size of a particle without changing a material. For example, as illustrated in FIG. 10, according to the quantum confinement effect, as a nano particle size is small, the quantum dot may emit blue light having a short wavelength, and as a nano particle size is large, the quantum dot may emit red light having a long wavelength.

A diameter of the quantum dots 910 dispersed in the polymer layer 920 is in the range of 1 nm to 10 nm. The quantum dot 910 according to the exemplary embodiment of the present invention may have a diameter of 5 nm to 7 nm in order to change blue light to red light. More particularly, the quantum dot 910 may have a diameter of 6 nm.

The quantum dot 910 may be a II-VI, III-V, or IV group material, and particularly, may be CdSe, CdTe, CdS, ZnSe, ZnTe, ZnS, InP, GaP, GaInP$_2$, PbS, ZnO, TiO$_2$, AgI, AgBr, Hg$_{12}$, PbSe, In$_2$S$_3$, In$_2$Se$_3$, Cd$_3$P$_2$, Cd$_3$As$_2$, or GaAs.

The quantum dot 910 may have a core-shell structure. Herein, a core may include any one material selected from the group consisting of CdSe, CdTe, CdS, ZnSe, ZnTe, ZnS, HgTe, and HgS, and a shell may include any one material selected from the group consisting of CdSe, CdTe, CdS, ZnSe, ZnTe, ZnS, HgTe, and HgS.

In the meantime, although not illustrated in the drawing, the quantum dot film 900 may additionally include a barrier layer (not illustrated) attached onto at least one surface of the polymer layer 920.

Figure 11:
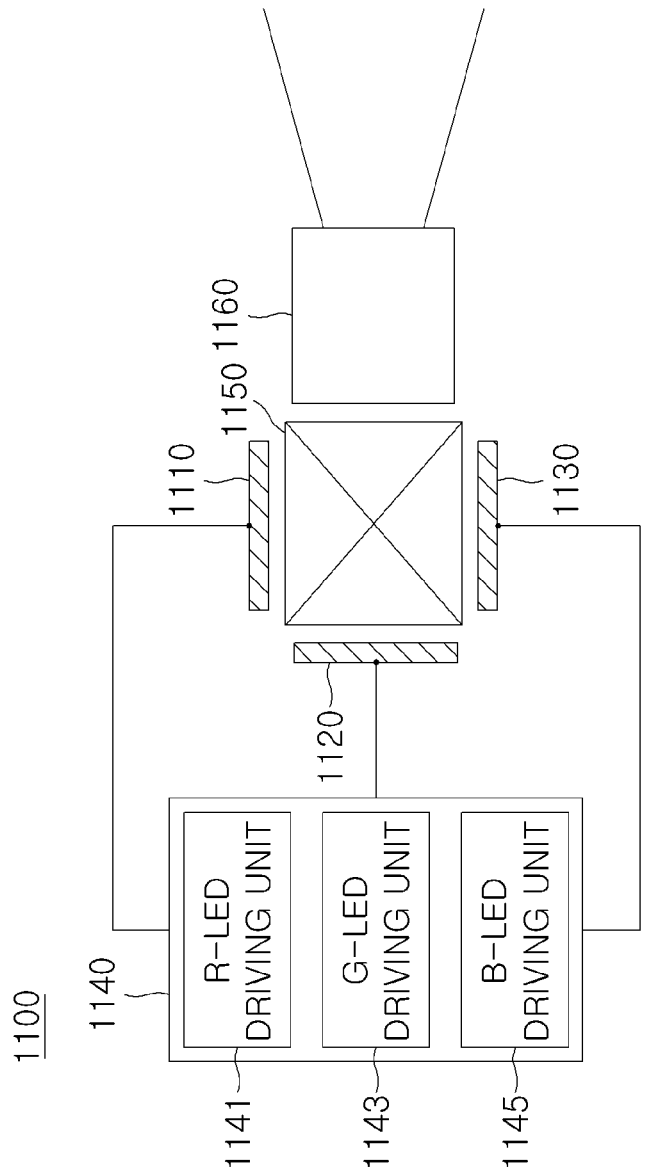
FIG. 11 is a configuration diagram of a projection device according to still another exemplary embodiment of the present invention.

FIG. 11 is a configuration diagram of a projection device according to still another exemplary embodiment of the present invention.

Referring to FIG. 11, a projection device 1100 according to still another exemplary embodiment of the present invention may include a red micro LED panel 1110, a green micro LED panel 1120, a blue micro LED panel 1130, an LED driving unit 1140, a dichroic prism 1150, a projection lens 1160, and the like. Herein, the remaining constituent elements other than the red micro LED panel 1110 are the same as the constituent elements illustrated in FIG. 2. Accordingly, detailed descriptions of the green micro LED panel 1120, the blue micro LED panel 1130, the LED driving unit 1140, the dichroic prism 1150, the projection lens 1160 illustrated in FIG. 11 will be omitted.

Unlike the projection device 100 of FIG. 2, the red micro LED panel 1110 configuring the corresponding projection device 1100 may be formed by a sapphire bonding avoiding process. Hereinafter, a method of fabricating the red micro LED panel by using the sapphire bonding process and a method of fabricating the red micro LED panel in which the sapphire bonding process is avoided will be discriminated and described.

FIGS. 12A to 12G are diagrams for describing a method of fabricating a red micro LED display device according to an exemplary embodiment of the present invention.

Figure 12A:
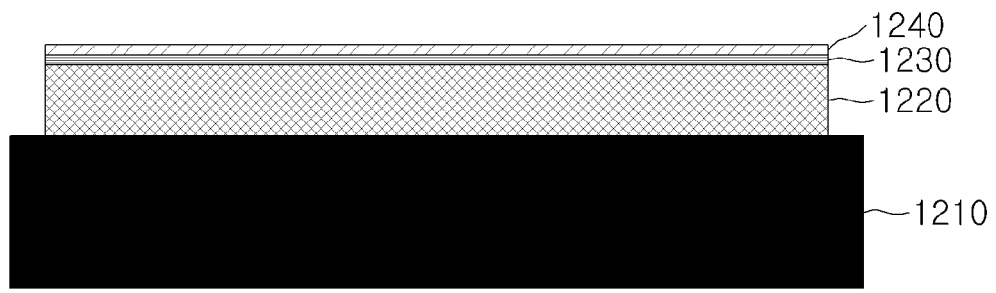
FIGS. 12A to 12G are diagrams for describing a method of fabricating a red micro LED display device according to an exemplary embodiment of the present invention.

Referring to FIG. 12A, emission structures 1220, 1230, and 1240 may be formed by sequentially growing a first conductive semiconductor layer 1220, an active layer 1230, and a second conductive semiconductor layer 1240 on a GaAs substrate 1210. Herein, instead of a sapphire substrate, the GaAs substrate is used because the GaAs has a similar lattice constant to that of the emission structures 1220, 1230, and 1240 emitting red light. Accordingly, when the emission structures 1220, 1230, and 1240 are stacked on the GaAs substrate 1210, strain due to a difference in a lattice constant is not generated.

Figure 12B:
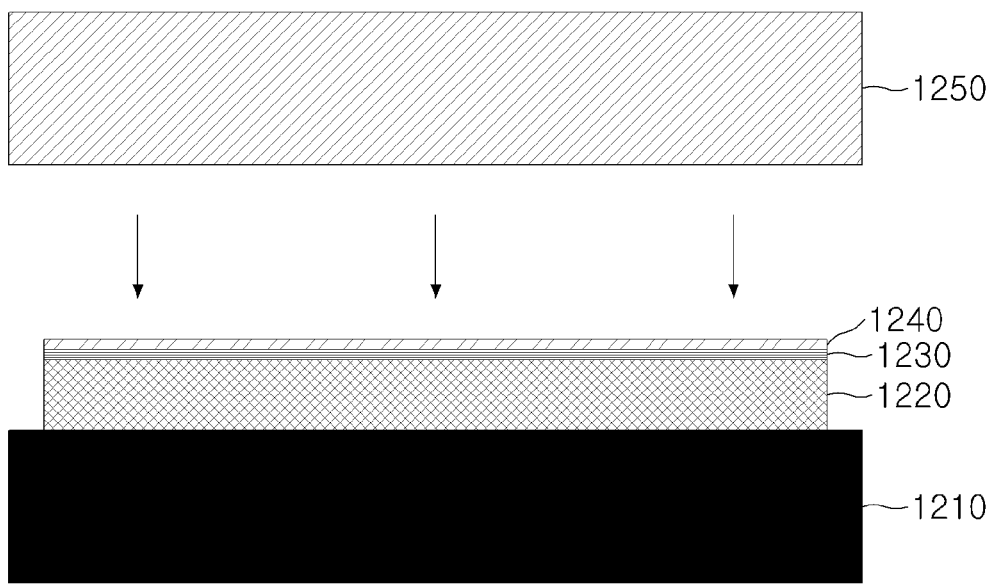

Referring to FIG. 12B, a first sapphire substrate 1250 may be bonded onto an upper surface of the second conductive semiconductor layer 1240. In this case, the second conductive semiconductor layer 1240 and the first sapphire substrate 1250 may be bonded by an adhesive layer or an adhesive. Herein, the first sapphire substrate 1250 may serve as a supporting layer for removing the GaAs substrate 1210.

Figure 12C:
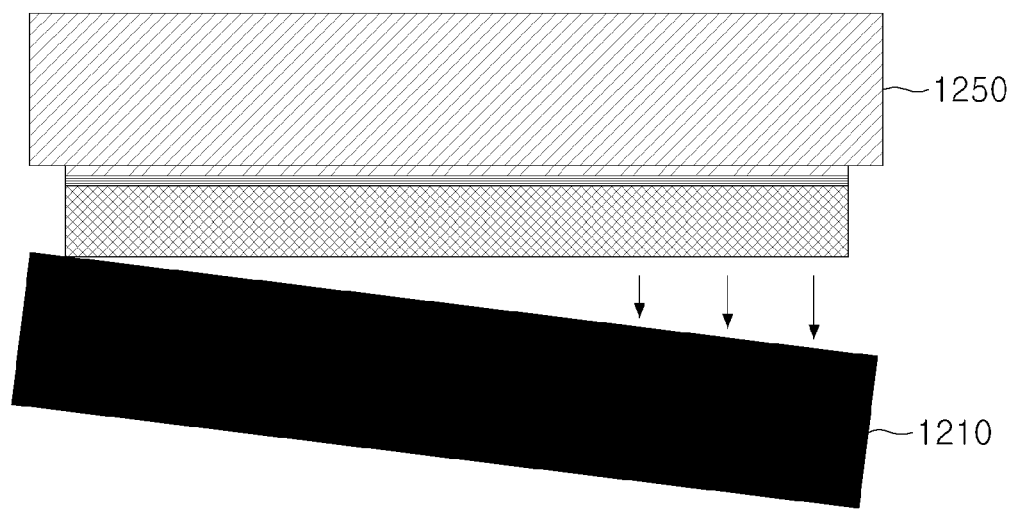

Referring to FIG. 12C, the GaAs substrate 1210 attached onto a lower surface of the first conductive semiconductor layer 1220 may be separated by a laser lift off (LLO) method, a chemical lift off (CLO) method, an electrical lift off (ELO), an etching method, or the like. Herein, because the GaAs substrate 1210 has a property of absorbing a wavelength of red light emitted from the emission structures 1220, 1230, and 1240, the GaAs substrate 1210 is separated. Accordingly, after the emission structures 1220, 1230, and 1240 is grown, it is necessary to replace the GaAs substrate 1210 with a sapphire substrate. In this case, because the sapphire substrate has excellent transmittance and price competitiveness beside other substrates, the sapphire substrate is used.

Figure 12D:
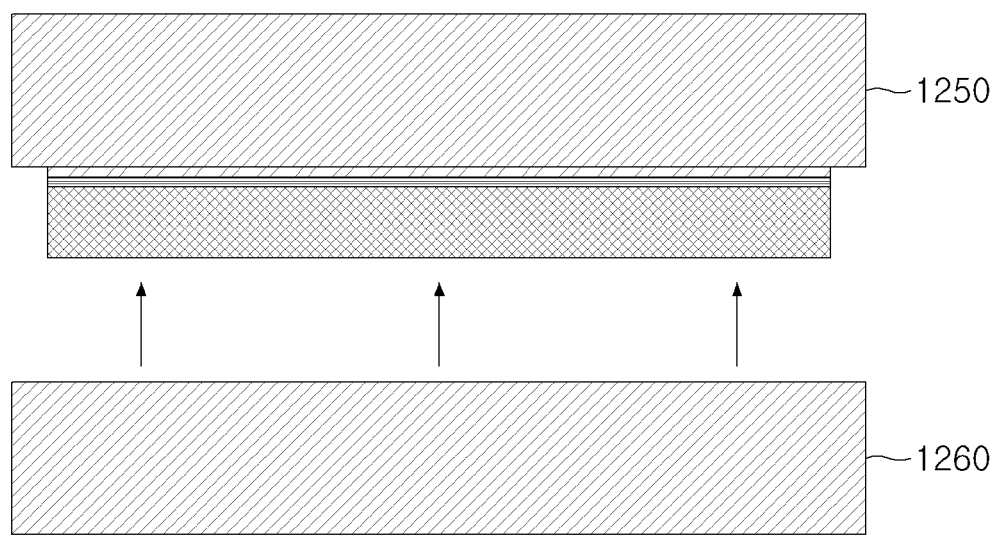

Referring to FIG. 12D, a second sapphire substrate 1260 may be bonded onto the lower surface of the first conductive semiconductor layer 1220. In this case, the first conductive semiconductor layer 1220 and the second sapphire substrate 1260 may be bonded by an adhesive layer or an adhesive. Herein, the second sapphire substrate 1260 is for the purpose of switching an up and down position of the emission structures 1220, 1230, and 1240.

Figure 12E:
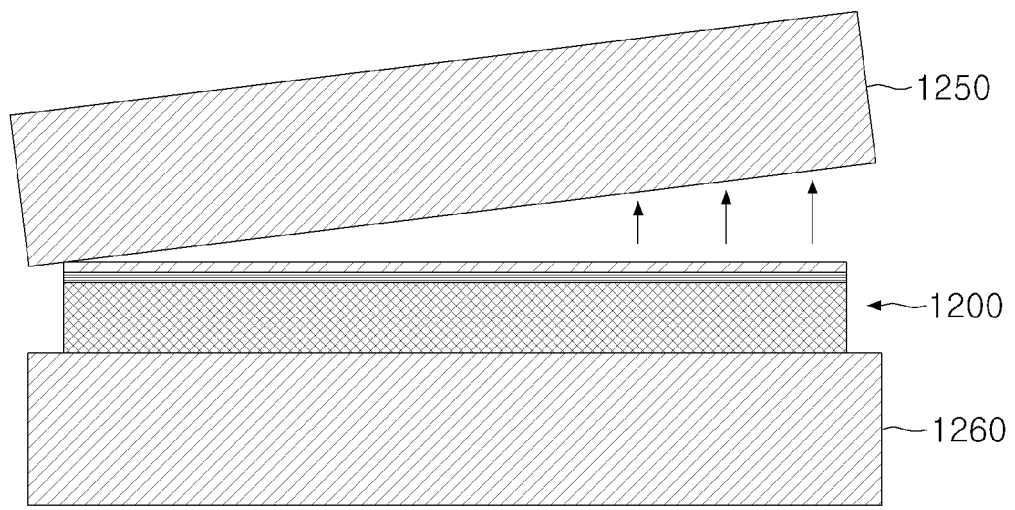

Referring to FIG. 12E, the first sapphire substrate 1250 attached onto an upper surface of the second conductive semiconductor layer 1240 may be separated by a laser lift off (LLO) method, a chemical lift off (CLO) method, an electrical lift off (ELO), an etching method, or the like.

Figure 12F:
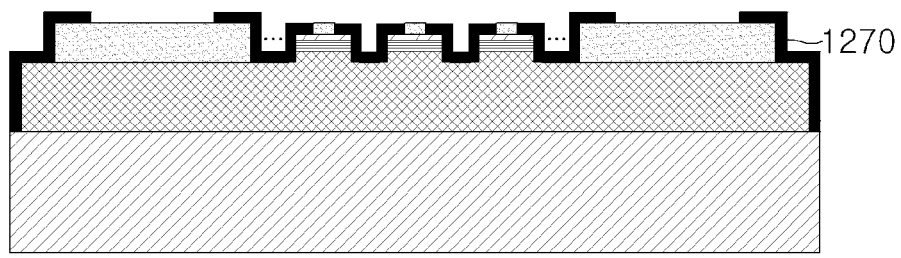

Referring to FIG. 12F, a plurality of LEDs (that is, a plurality of micro LED pixels) may be formed by performing an isolation etching process on the emission structures 1220, 1230, and 1240 according to a unit pixel region and stacking a positive (+) electrode and a negative (−) electrode on the mesa-etched emission structures 1220, 1230, and 1240. Then, a micro LED panel 1200 may be formed by performing a passivation process on the emission structures 1220, 1230, and 1240.

Figure 12G:
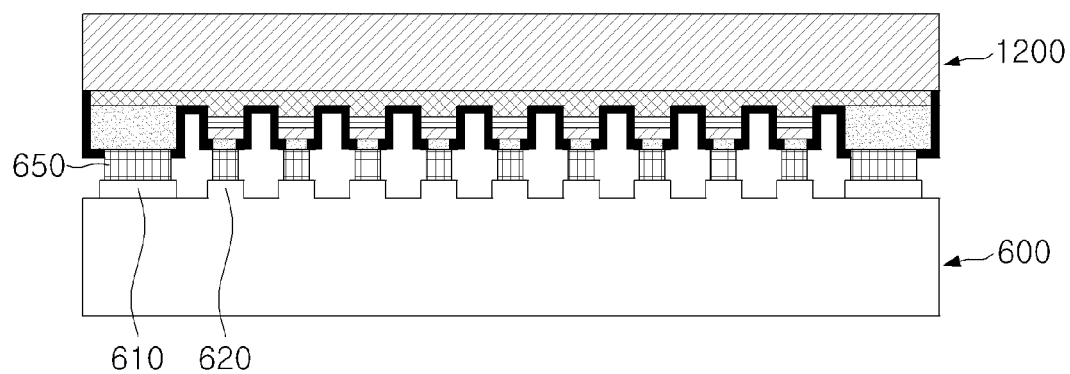

Referring to FIG. 12G, the plurality of bumps 650 is disposed on the CMOS cells 620 and the common cell 610 of the CMOS backplane 600. The first and second conductive metal layers are made to head downwardly by inverting up and down the micro LED panel 1200. Then, the CMOS cells 620 are in close contact with the micro LED pixels by making the CMOS backplane 600 in the state where the plurality of bumps 650 is disposed face the micro LED panel 1200 and corresponding one-to-one the CMOS cells 620 and the micro LED pixels, and then heating is performed on the CMOS cells 620 and the micro LED pixels. Then, the plurality of bumps 650 is melted, and as a result, the CMOS cells 620 and the corresponding micro LED pixels are electrically connected, and the common cell 610 of the CMOS backplane 600 and a common electrode of the micro LED panel 1200 corresponding to the common cell 610 are electrically connected. As described above, it is possible to implement the micro LED display device by flip-chip bonding the CMOS backplane 600 and the micro LED panel 1200 through the plurality of bumps 650.

However, in the foregoing method of fabricating the red micro LED panel, the sapphire bonding process is performed two times, so that there is a problem in that performance of the LED chips configuring the corresponding panel is degraded and yield of the micro LED chips is reduced. Accordingly, there is required a method of fabricating a red micro LED panel requiring no sapphire bonding process. Hereinafter, in another exemplary embodiment of the present invention, a method of fabricating a red micro LED panel in which a sapphire bonding process is avoided will be described.

FIGS. 13A to 13E are diagrams for describing a method of fabricating a red micro LED display device according to another exemplary embodiment of the present invention.

Figure 13A:
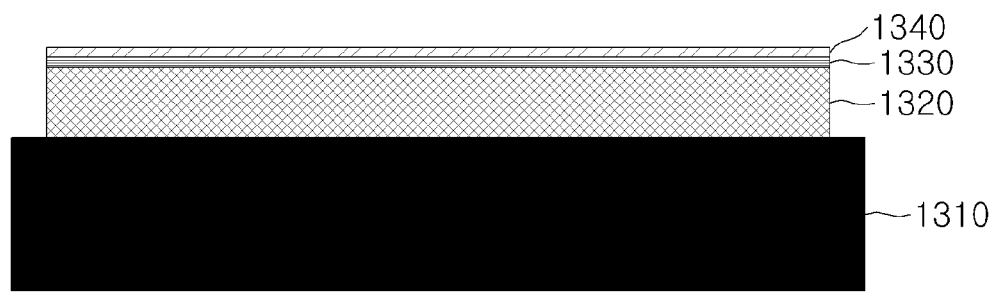
FIGS. 13A to 13E are diagrams for describing a method of fabricating a red micro LED display device according to another exemplary embodiment of the present invention.

Referring to FIG. 13A, emission structures 1320, 1330, and 1340 may be formed by sequentially growing a first conductive semiconductor layer 1320, an active layer 1330, and a second conductive semiconductor layer 1340 on a GaAs substrate 1310. In this case, the emission structures 1320, 1330, and 1340 may emit red light.

Figure 13B:
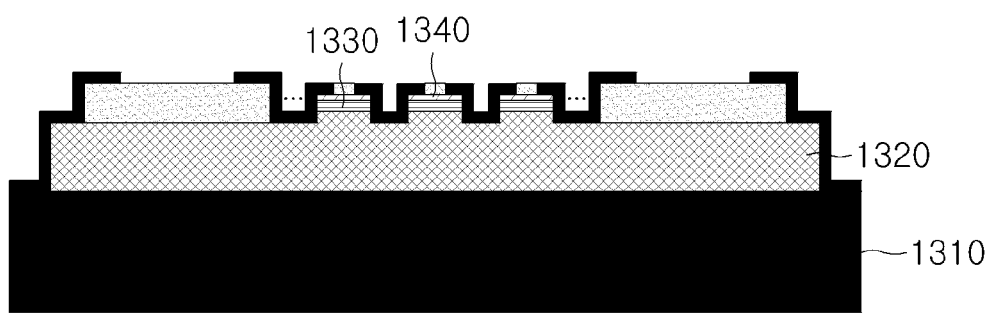

Referring to FIG. 13B, a plurality of LEDs (that is, a plurality of micro LED pixels) may be formed by performing an isolation etching process on the emission structures 1320, 1330, and 1340 according to a unit pixel region and stacking a positive (+) electrode and a negative (−) electrode on the mesa-etched emission structures 1320, 1330, and 1340. Then, a micro LED panel may be formed by performing a passivation process on the emission structures 1320, 1330, and 1340.

Figure 13C:
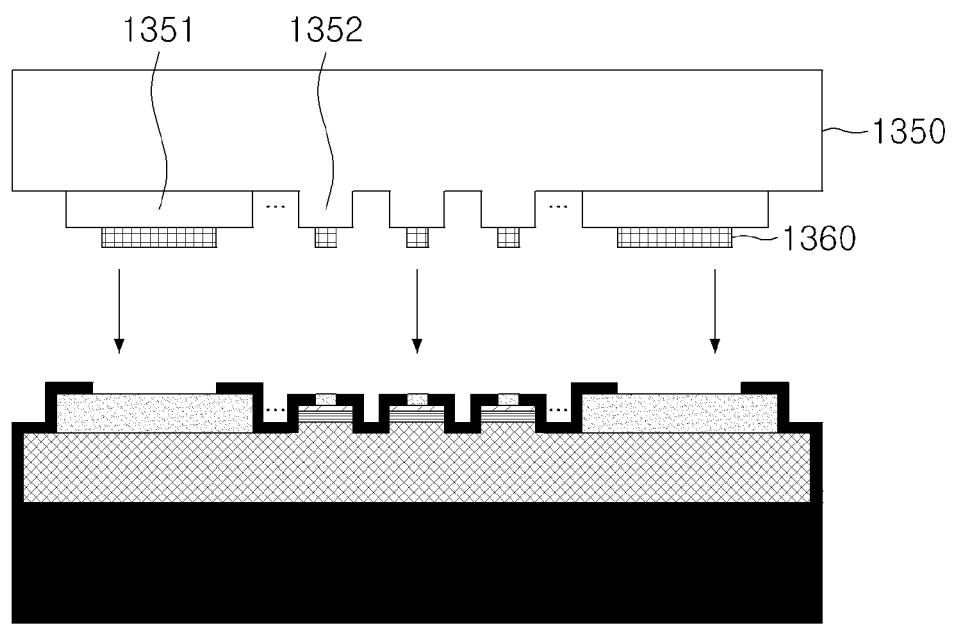

Referring to FIG. 13C, a plurality of bumps 1360 is disposed on CMOS cells 1352 and a common cell 1351 of a CMOS backplane 1350. Then, the CMOS cells 1352 are in close contact with the micro LED pixels by making the CMOS backplane 1350 in the state where the plurality of bumps 1360 is disposed face the micro LED panel and corresponding one-to-one the CMOS cells 1352 and the micro LED pixels, and then heating is performed on the CMOS cells 1352 and the micro LED pixels. Then, the plurality of bumps 1360 is melted, and as a result, the CMOS cells 1352 and the corresponding micro LED pixels are electrically connected, and the common cell 1351 of the CMOS backplane 1350 and the common electrode of the micro LED panel corresponding to the common cell 1350 are electrically connected.

Figure 13D:
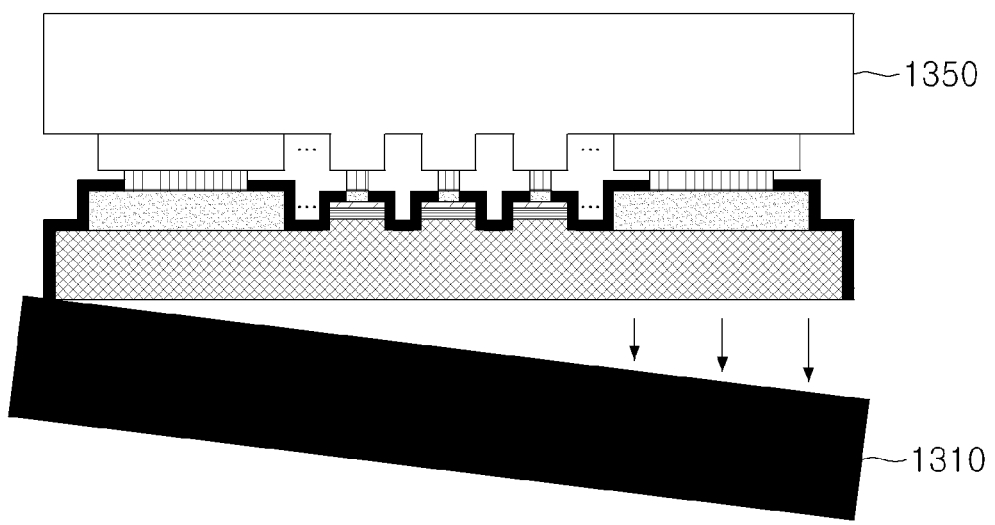
Figure 13E:
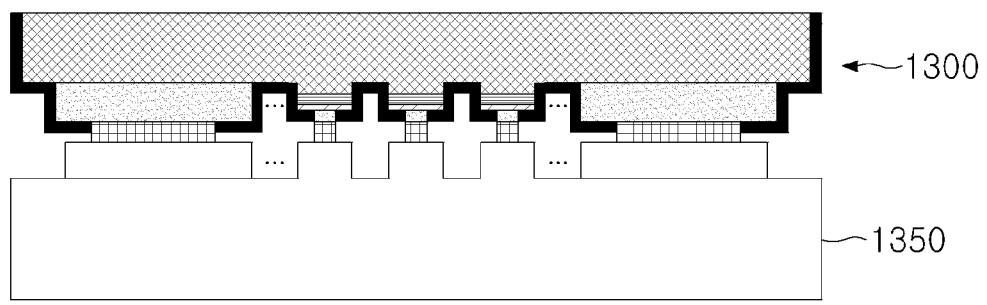

Referring to FIGS. 13D and 13E, the GaAs substrate 1310 attached onto a lower surface of the emission structures 1320, 1330, and 1340 may be separated by a laser lift off (LLO) method, a chemical lift off (CLO) method, an electrical lift off (ELO), an etching method, or the like. In the meantime, as another exemplary embodiment, before the process of separating the GaAs substrate 1310, a protecting process for minimizing damage to the LEDs due to the separation process may be added. Through the series of processes, it is possible to implement the red micro LED panel in which the sapphire process is avoided.

As described above, the method of fabricating the red micro LED panel according to the present invention may remarkably decrease the number of panel fabricating processes, thereby improving yield of a product and minimizing deterioration of performance generated during the fabricating process. Further, the red micro LED panel according to the present invention does not include a sapphire substrate, unlike the blue and green micro LED panels, so that it is possible to improve optical efficiency and minimize light scattering.

In the meantime, in the present exemplary embodiment, the case where the red micro LED panel is applied to the PICO projector 1100 is exemplified, but is not limited thereto, and the red micro LED panel is applicable to various display devices, such as a head-up display (HUD) for a vehicle or a head mounted display (HMD) which will be apparent to those skilled in the art.

In the meantime, in the foregoing, the particular exemplary embodiments of the present invention have been described, but may be variously modified without departing from the scope of the invention as a matter of course. Accordingly, the scope of the present invention is not limited to the exemplary embodiment, and should be defined in equivalents of the claims, as well as the claims to be described below.

What is claimed is:

1. A method for fabricating a third micro light emitting diode (LED) display device in a projection device which includes a first micro LED display device outputting light of a first wavelength, a second micro LED display device outputting light of a second wavelength and the third micro LED display device outputting light of a third wavelength, the method comprising:

forming a GaAs substrate;

stacking emission structures on the GaAs substrate, the emission structures comprising a first conductive semiconductor layer, an active layer, and a second conductive semiconductor layer;

making a micro LED panel including a plurality of micro LED pixels formed by performing an etching process on the emission structures according to a unit pixel area and a first conductive metal layer formed along an outer region of the plurality of micro LED pixels;

making a silicon substrate including an active matrix (AM) circuit unit comprising a plurality of CMOS cells corresponding to the plurality of micro LED pixels and a common cell disposed on an outer region of the AM circuit unit;

flip-chip bonding the micro LED panel onto the silicon substrate; and separating the GaAs substrate attached onto the micro LED panel, wherein the first conductive metal layer disposed on the outer region of the plurality of micro LED pixels is electrically connected to the common cell disposed on the outer region of the AM circuit unit by flip-chip bonding the micro LED panel onto the silicon substrate.

2. The method of claim 1, wherein the light of the third wavelength is red light.

3. The method of claim 1, wherein, in the flip-chip bonding, bumps are formed in the plurality of CMOS cells, respectively, and are melted by heating, and each of the plurality of CMOS cells and the micro LED pixel corresponding to each of the plurality of CMOS cells are electrically connected by the melted bumps.

4. The method of claim 1, wherein the separating includes separating the GaAs substrate using any one of a laser lift off (LLO) method, a chemical lift off (CLO) method, an electrical lift off (ELO) and an etching method.

5. The method of claim 1, wherein the first conductive metal layer is formed along an outer region of the plurality of micro LED pixels on the first conductive semiconductor layer.

6. The method of claim 1, wherein the first conductive metal layer serves as a common electrode of the plurality of micro LED pixels.

* * * * *